Nov. 14, 1939. H. HONNEF 2,180,206
WIND-OPERATED ELECTRICAL POWER STATION
Filed Dec. 21, 1937
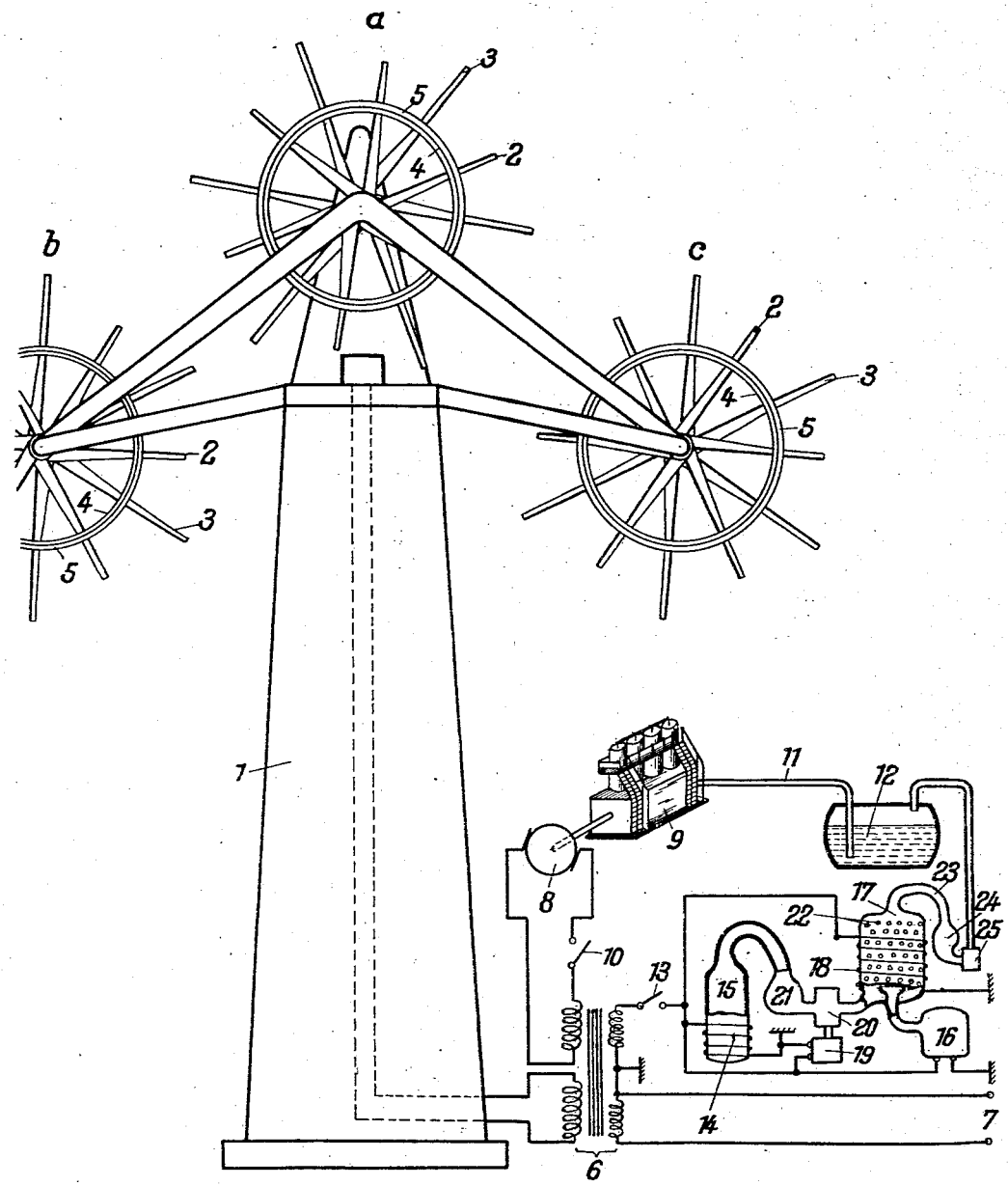
Inventor:
Hermann Honnef
By: Richardson and Auer
Attys.

Patented Nov. 14, 1939

2,180,206

UNITED STATES PATENT OFFICE 2,180,206

WIND-OPERATED ELECTRICAL POWER STATION

Hermann Honnef, Berlin, Germany

Application December 21, 1937, Serial No. 180,957

9 Claims. (Cl. 290—4)

The present invention is concerned with an auxiliary arrangement for wind-operated electrical power stations whereby particularly advantageous storing of excess energy and utilization of the stored energy during periods of peak load is accomplished. This application is directed to the same invention as my prior application, Ser. No. 133,086, filed March 25, 1937.

The efficiency of electrical power stations must always be calculated with due consideration for the handling of load peaks. According to my invention, therefore, power stations are equipped with auxiliary devices which serve the purpose of utilizing the excess energy which is available at times of normal or minimum load by storing it for use later during the peak load periods. Such an equalization is particularly important in the case of wind power operated electrical power stations, because in these installations a load maximum is frequently coincident with an output minimum, and vice versa. Since a storing of the electrical energy by means of batteries can be practicable only in case of small wind power machines, it has been suggested in case of large wind power stations to use electrolytic cells wherein the excess energy is used for the production of combustible gases, particularly hydrogen, which is stored in cylinders and can be used at the desired time. This process is not economical, however, for several reasons, and particularly on account of the cost of the storage cylinders.

My invention is concerned with a considerably improved storing method which has the advantage that the energy is stored in normal low pressure condensers and is fed to these condensers through low pressure lines, with the additional advantage that the stored energy is very easily and quickly converted back into electrical energy. Based on my invention, I am able to store the energy available during times of excess production not only for hours, days, weeks, or months, for the purpose of operating electrical auxiliary generators which serve the requirements during peak loads, but I have, above all, provided for the possibility of putting auxiliary generators into full operation in a few minutes in case of a sudden lowering of the output of the power station or a sudden increase of the load, or both.

In accordance with my invention, hydrogen is obtained by electrolytic use of a part of the excess energy, while another part of the excess energy is used for the electrical supply of the required apparatus provided for the dewatering, splitting, and hydrogenation of carbonaceous materials, such as anthracite, bituminous coal, wood, peat or the like, which are converted into liquid fuel. This is stored and used at the required time for feeding internal combustion engines which drive the electrical auxiliary generators. The excess energy, therefore, is split into different parts which meet the energy requirements of the individual phases of a chemical process in the course of which a substance of little useful energy contact is converted into a liquid substance which is easily distributed through a pipe system and whose combustion energy can be put to use in Diesel engines, or the like, without a troublesome pre-heating. The Diesel power is ready for use at any time and at high efficiency for handling load peaks by corresponding current production.

The attached drawing explains the invention. Upon a tower 1 about 300 meters high are mounted three electrical generators a, b, and c, each of which comprises two oppositely rotating wind turbines 2 and 3, the one constituting the stator 4 and the other the rotor 5. The produced current is delivered to the supply line 7 by means of a transformer 6. This transformer has a second primary winding which is connected with the auxiliary generator 8 driven by the Diesel engine 9. The Diesel engine, however, is only operated in case the output of the wind-operated generators a, b, and c is not sufficient to cover the current requirements of the supply line 7. The switch 10 is in this case closed so that the generator 8 first operates as a motor and starts the Diesel engine. The feeding of the Diesel engine 9 with fuel is taken care of over the pipe line 11 from the reservoir 12.

The transformer 6 also has a second secondary winding, one pole of which is grounded and the other pole of which is connected with a switch 13. The latter may be closed at times when the wind-operated generators a, b, and c deliver more electrical current than the supply line 7 can utilize. Upon closing the switch 13, the electrical furnace represented by the heating coils 14 is connected to current and heats the retort 15 containing, for example, bituminous coal. At the same time the electrolytic cells 16 are connected, which generate the hydrogen and supply it under high pressure from below into the reaction container 17. This container is heated by the electrical oven represented by heating coils 18 and coal tar is fed thereto from below under high pressure by means of a pump 20 driven by an electrical motor 19. The coal tar is produced by dewatering and distilling operations in the retort 15 and in the cooling container 21. The reaction container 17 is filled with granular bodies 22 having a porous surface which is impregnated with a catalyzer. Within the reaction vessel 17 the coal tar is converted by hydrogenation into Diesel engine oil which boils at relatively low temperature, and therefore distills over the line 23 into the cooling vessel 24, whence it flows through the pressure-reducing valve 25 into the reservoir 12.

The capacity of the different units of the system should be such that during normal use over considerable periods the hydrogenation process may be continuously in operation; that is, the switch 13 is not opened during brief and temporary periods of peak load. The wind generator should, therefore, be able to supply the normal load on the supply line 7 and also produce sufficient excess power to carry on the hydrogenation process. At times of peak load the Diesel engine may be quickly started and stopped to provide the additional power which is temporarily needed. In case of a protracted overload on the system, however, or a long period of calm in which the wind generator output is reduced, the switch 13 may be opened to shut down the auxiliary fuel-producing apparatus.

The apparatus schematically represented in the drawing for conversion of the carbonaceous material into liquid fuels may correspond to the apparatus shown in Patent No. 1,876,009. It is clear, however, that other similar apparatus may be used wherein, for example, bituminous coal is not distilled but only dewatered and roasted, or wherein the anthracite serves as the basic material and the hydrogenation is taken care of in a larger number of reaction vessels which may be arranged in staggered relation in a cascade series until the liquid fuel is produced which is suitable for operation of internal combustion engines.

As will be apparent from the above description, the invention consists in the use of the hydrogen produced by the excess energy for the purpose of converting carbonaceous substances into liquid fuels (also using another part of the excess energy for this step), whereby the excess energy is converted into potential energy of a liquid which is easily stored and easily conducted through simple pipe lines; and in the use of the fuel thus stored for the operation of auxiliary generators driven by internal combustion machines, the output of which is at any time available within a few seconds for taking care of peak loads.

I claim:

1. In a wind-operated electrical power system, means for utilizing part of the excess power developed for the generation of hydrogen, means for utilizing the hydrogen thus generated and another part of the excess power for the operation of a hydrogenation plant by means of which carbonaceous material such as coal is converted into liquid fuel, means for storing said fuel, and means including a generator and an internal combustion engine for utilizing the stored fuel at times of peak load to supply additional power to said system.

2. In a wind-operated electrical power system, a hydrogen generator, a retort for producing coal tar, means for using part of the excess power developed in said system for operating said generator and another part for heating said retort, a reaction chamber for receiving the hydrogen and coal tar from said generator and retort, respectively, means for utilizing another part of the excess power developed in said system for heating said reaction chamber, whereby liquid fuel is produced by the hydrogenation of said coal tar, means for storing said fuel, and means including a generator and an internal combustion engine operating on the stored fuel for returning power to said system during periods of peak load.

3. In a wind-operated electrical power system including generating means and a power supply line, means for taking excess power from said line, means for splitting the excess power withdrawn into frictional parts and for using such parts in the respective steps of a process of producing liquid fuel from carbonaceous material such as coal, means for storing said fuel, means for supplying additional power to said line at times of peak load, said last means comprising a generator and an internal combustion engine operating on said stored fuel, and switching means whereby the operation of the said means for taking excess power from the line and the said means for supplying additional power to the line may be initiated at will.

4. In a wind-operated electrical power system including a generator and a power supply line, apparatus for the generation of hydrogen and for the production of liquid fuel from coal or the like by a continuous hydrogenation process, means for withdrawing power from said line to operate said apparatus, means for storing said fuel, and means for utilizing the stored fuel from time to time while said process is going on in order to supply additional power to said line during peak load periods, said last means comprising a generator and an internal combustion engine operating on the said stored fuel.

5. In a wind-operated power plant, a wind generator continuously connected to supply power to a power line, said generator having a normal output greater than the normal load on said line but less than the peak load, a second generator adapted to be connected to said power line to help carry the peak load, an internal combustion engine for driving said second generator, means for starting said engine at will, means for taking surplus power from the wind generator during periods of normal load on the power line, and means for utilizing said surplus power to manufacture synthetic fuel for use in said engine.

6. In a wind-operated power plant, a wind generator, a power line connected to said wind generator and supplied with power thereby, an internal combustion engine maintained in starting condition, a generator coupled to said engine, means for connecting said second generator in parallel with said wind generator at times when the output of the latter is insufficient to supply the load on said power line, whereby the second generator operates as a motor to start said engine and thereafter is driven by the engine to deliver power to said power line in parallel with the wind generator, apparatus for producing liquid fuel from carbonaceous material for operating said engine, and means for utilizing surplus power from the wind generator when the load on the power line is low for operating said apparatus.

7. A wind-operated power plant comprising a wind generator, a generator output circuit, a power line coupled to said output circuit and continuously supplied with power therefrom, apparatus for producing liquid fuel from carbonaceous material, a power circuit coupled to said output circuit for operating said apparatus, a storage device for said fuel, an internal combustion engine operable by fuel supplied from said storage device, a generator directly connected to said engine, an output circuit for said last mentioned generator coupled to said power line, a switch for closing the power circuit for said apparatus during periods when the output from the wind generator safely exceeds the demand on the power line, and a switch for closing the output circuit of the second generator to start said engine and cause the second generator to deliver power to the power line in parallel with the wind generator during periods of peak demand.

8. In a power plant, a power line, a wind generator and a generator driven by an internal combustion engine operating in parallel to deliver power to said line, means for disconnecting the second generator at times when load conditions on the power line are such that it is not required, a circuit for taking excess power from the wind generator, and means for utilizing such excess power to manufacture liquid fuel for said internal combustion engine.

9. In a power plant, a transformer having two primary and two secondary windings, a wind generator connected to one primary winding, a Diesel engine generator set having the generator connected to the second primary winding, a power line connected to one secondary winding, a hydrogenation plant, a power circuit for operating said plant connected to the other secondary winding, and switching means for independently closing the circuit of the second primary winding and the circuit of the second secondary winding to operate the Diesel engine or the hydrogenation plant at will.

HERMANN HONNEF.